United States Patent
McCannon et al.

(10) Patent No.: US 6,607,314 B1
(45) Date of Patent: Aug. 19, 2003

(54) APPARATUS FOR AND METHOD OF UPDATING A SOFTWARE ROUTINE

(75) Inventors: Martin D. McCannon, Meridian, ID (US); Mark N. Anderson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 240 days.

(21) Appl. No.: 09/679,229

(22) Filed: Oct. 3, 2000

(51) Int. Cl.$^7$ .............................................. B41J 5/30
(52) U.S. Cl. ..................................................... 400/62
(58) Field of Search ..................... 400/61, 62; 395/114, 395/115; 347/7

(56) References Cited

U.S. PATENT DOCUMENTS

| | | | | |
|---|---|---|---|---|
| 5,511,152 A | * | 4/1996 | Lai et al. .................... | 395/115 |
| 5,580,177 A | | 12/1996 | Gase et al. .................... | 400/61 |
| 5,633,992 A | | 5/1997 | Gyllenskog ................ | 395/114 |
| 5,832,191 A | | 11/1998 | Thorne ........................ | 395/114 |
| 6,113,208 A | * | 9/2000 | Benjamin et al. ............. | 347/7 |

FOREIGN PATENT DOCUMENTS

JP  411161443 A  *  6/1999  ............ B41J/29/38

* cited by examiner

Primary Examiner—Anh T. N. Vo

(57) ABSTRACT

A printer attached to a computer using a driver routine includes an appropriate interface configured to receive, from the computer, an intermediate, device non-specific code such as a Page Description Language (PDL) message generated by an active printer driver routine and provide a corresponding bitmap. The computer may be a standalone workstation connected to the printer or a server providing printer services to a network of users. The printer also has a print engine configured to print an image corresponding to the bitmap. A communications interface is connected to receive a latest version of the printer driver routine which is then stored in a local memory that is part of the printer. The printer further includes a local processor for selectively supplying the computer with the latest version of the printer driver routine from the local memory. The local printer processor may be responsive to a version designation of the active printer driver routine (i.e., the routine installed in the client computer or local server) for selectively supplying the latest version of the print driver routine. The printer may be connected to the computer over a dedicated printer channel, such as a parallel or serial printer port. The communications interface for receiving updated driver routines may include connectivity to a wide area network, such as the Internet, to provide access to a centralized database of printer servers including the latest versions of the drivers.

20 Claims, 3 Drawing Sheets

APPARATUS FOR AND METHOD OF UPDATING A SOFTWARE ROUTINE

TECHNICAL FIELD

The invention relates to computer peripheral equipment and in particular to automatic updating of device drivers and other software routines.

BACKGROUND

Computer systems of various makes and manufacture are often required to interface with other systems and, in particular, peripheral devices having varied signaling, control and protocol requirements. Rather than require each application process, or operating system, have the capability to accommodate the specialized signaling and control requirements of a particular device, interfacing software in the form of device specific drivers is often supplied with device hardware. Thus, drivers are required for devices such as printers, scanners, disk drives, keyboards, etc. While some drivers, such as for a keyboard, are included with the computer operating system, others are loaded when a device is initially attached or connected to the computer.

The driver translates data between a device and programs that use the device. Each device includes specialized commands that are available only through the driver. In contrast, an application accesses devices using generic commands. The driver, therefore, accepts generic commands from a program and translates them into specialized commands for the device.

For example, an application, such as a word processing program, may generate a print file using a Graphical Device Interface (GDI) or a Device Driver Interface (DDI). A printer driver specific to the selected attached printer, then translates the print file into commands and a data format and protocol understood by that printer.

Thus, a computer operator must obtain and load drivers required to interface each of the varied devices attached to a computer. In addition, to access increased functionality or compatibility, the operator must update previously installed drivers as new versions are issued and released. In support of this function, device manufacturers maintain customer service facilities including databases for users to download the latest versions of supported device drivers. For example, the assignee of the instant patent application maintains an Internet web site for users to download the most recent version of device drivers. The assignee further provides for notification to registered customers when drivers are updated.

Another method of distributing device drivers to users is described in U.S. Pat. No. 5,580,177 of Gase, et al. entitled "Printer/client Network With Centrally Updated Printer Drivers And Printer Status Monitoring" and issued on Dec. 3, 1996 to the Assignee of the present application. The patent describes a network configuration including multiple client processors, a file server and multiple printers. Each client processor has stored in memory a printer driver procedure which enables the client processor to interface with at least one printer type. The file server includes memory for storing a most updated printer driver procedure for each printer type coupled to the file server. The file server is responsive to a print request from a client processor to assign a printer to the requesting client processor. The file server, in combination with the client processor, determines if a printer driver procedure for the assigned printer in the client processor is identical to a most updated printer driver procedure stored in memory in the file server. If not, the file server enables alteration of the printer driver procedure in the client processor to bring it into coincidence with the most updated print driver procedure. The disclosure of U.S. Pat. No. 5,580,177 is incorporated herein by reference in its entirety.

Configuring a network to attach a printer is further described in U.S. Pat. No. 5,832,191 of Thorne entitled "Method And Apparatus For Automatically Enabling Communication With A Network Printer" and issued on Nov. 3, 1998 to the Assignee of the present application. The patent describes a method of enabling a new printer to automatically communicate over a network with client processors connected to the network. The network is at least partially controlled by a network server which, for each respective printer, stores an "agent" data structure. The agent data structure maintains information about the respective client-accessible printer. The method begins by responding to a message from a new printer by storing printer identification data included in the message. An instance of an agent data structure is then established using data from the message. Communications with the new printer are established to obtain further data concerning the new printer for addition to the agent data structure. An instance of a communication data structure is then established and data is inserted in that data structure to configure a communication procedure which enables communication with both the newly connected printer and the printer's agent data structure. A printer request from a client processor is handled by employing the communication data structure to automatically establish a communication pathway between the client processor and the new printer and providing data regarding the new printer from the agent data structure to the client processor for use thereby. The disclosure of U.S. Pat. No. 5,832,191 is likewise incorporated herein by reference in its entirety.

While these systems and methods provide a flexible arrangement for distributing drivers to server clients, they are not directed to standalone computers. These patents instead rely on storage at and distribution of drivers by a central print server to clients. Further, these disclosures do not address obtaining copies of updated drivers.

Accordingly, a need exists for a system and method for providing application and operating system software with updated interfacing software to help ensure compatibility and maximize functionality between and among processes, objects and devices.

SUMMARY OF THE INVENTION

According to one aspect of the invention, a printer includes a printer interface configured to receive, from a remote processor, a Page Description Language (PDL) message generated by an active printer driver routine and provides a corresponding bitmap. The remote processor may be a Personal Computer (PC) or workstation connected to the printer or a server providing printer services to a network of users (e.g., clients). The printer also has a print engine configured to print an image corresponding to the bitmap. A communications interface is connected to receive a latest version of the printer driver routine which is then stored in a memory that is part of the printer. The printer further includes a local processor for selectively supplying the remote processor (e.g., PC) with the latest version of the printer driver routine from the local memory.

According to a feature of the invention, the local printer processor is responsive to a version designation of the active printer driver routine (e.g., the routine installed in the client computer or local server) for selectively supplying the latest version of the print driver routine.

According to another feature of the invention, the printer is connected to the remote processor by way of a dedicated printer channel, such as a parallel or serial printer port. The communications interface may include connectivity to a wide area network, such as the Internet, to provide access to a centralized database of printer servers including the latest versions of the drivers.

According to another feature of the invention, a processor integral to the printer is configured (e.g., executes software and/or firmware) causing it to access a remote centralized database of printer drivers and download into local memory the latest version of the printer driver routine from the remote centralized database. The process detects a version of the active printer driver routine. The detection may be performed independently of a print job or may be performed in response to a receipt of a print job by the printer. The printer may be further operable to inform the computer to which it is attached that an updated printer driver is required and/or is available, by selectively transmitting a message to the remote processor in response to the version of the active printer driver routine being older than the latest version. The message may include a query to a user of the remote processor (e.g., the computer or server operator) informing the user of an availability of a later version of the printer driver routine and soliciting a response about downloading the later version of the printer driver routine from the printer to the remote processor. The printer may also examine (e.g., parse) the PDL message generated by the active printer driver routine to detect the version of the active printer driver routine in use.

According to another aspect of the invention, a method of printing computer output includes retrieving, from a remote resource (e.g., a printer manufacturer's customer support web site), a latest version of a printer driver and storing the driver in a local printer memory. The printer then identifies a version of a printer driver installed on a remote processor and selectively updates the printer driver installed on the remote processor with the latest version of the printer driver. The printer receives, from the remote processor, a Page Description Language (PDL) message generated by a version of the printer driver. The printer driver may be an older version, subject to updating, or may represent the latest version as downloaded from the printer according to the method. The printer processes the PDL message to provide a bitmap and prints the bitmap to paper.

According to another aspect of the invention, a method of updating a software routine, such as a device driver, includes maintaining a centralized database including a latest version of the software routine. The centralized database may be, for example, a local server, a remote web site, or other resource accessible by a local printer. Communication is established with the centralized database from a location remote from the database. A latest version of the software routine is retrieved from the centralized database and stored in a first device located at the remote location. The software routine is such that an operation of the first device is dependent upon a use of the software routine by a second device. For example, the software routine might comprise a printer driver installed and operating on the second device (e.g., a printer server) such that the first device (e.g., printer) is dependent on the printer server functionality performed.

A version of the software routine on the second device is identified and, in response, the software routine installed on the second device is selectively updated with the latest version of the software routine as necessary. Once installed, data such as print files, may be processed using the latest version of the software routine to provide processed data, the processed data being transmitted from the second device to the first device, the processed data being further processed by the first device to perform the subject operation, e.g., print a page of output.

According to another feature of the invention, the step of processing data using the latest version of the software routine to provide processed data includes processing a print file to provide the processed data to the first device using a PDL.

The various aspects of the invention can be used to provide apparatus for and methods of maintaining an updated interface module at a resource for use by a client. A driven device maintains a local copy of the appropriate driver to be used by interfacing apparatus. Upon detecting the use of an old version of an interface module, the driven device notifies the user that an updated version is available for download and provides collateral information about the updated software. Collateral information may include new capabilities or compatibility criteria.

The foregoing has outlined rather broadly the features of various embodiments of the present invention in order that the detailed description of the invention that follows may be better understood. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
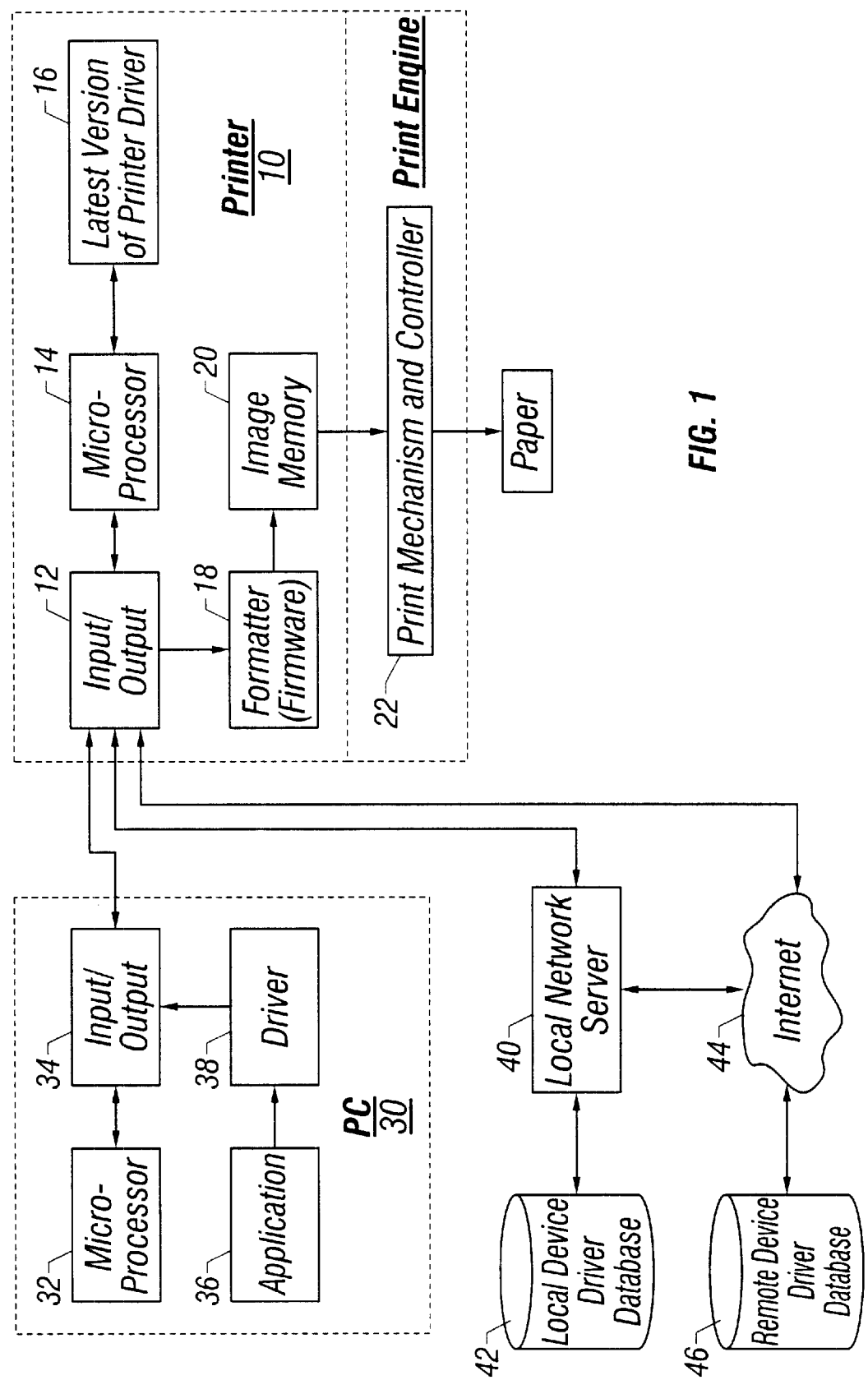
FIG. 1 is a block diagram of a system according to a preferred embodiment of the invention for automatically updating a local copy of a device driver stored at a device connected to receive an output from the driver.

FIG. 1 is a block diagram of a system according to the invention for automatically updating a local copy of a device driver, in this case a printer driver, wherein a copy of the most recent version of the device driver is stored in a memory of the device receiving the output from the device driver, e.g. a printer in the case of a print driver. Referring to FIG. 1, a printer 10 includes input/output circuitry 12 receiving printer commands and printable data in the form, for example, of an appropriate Page Description Language (PDL) or Printer Control Language (PCL). Input/output module 12 also includes an interface for requesting and receiving printer driver routines under the control of microprocessor 14. Microprocessor 14 may control both the printing operations of printer 10 and auxiliary operations such as the updating of driver routines to be stored in a memory 16. Thus, as shown, a latest version of the printer driver is stored in memory 16.

Printer 10 further includes conventional printer circuitry and assemblies including a formatter 18 embodied in firmware for converting PCL to bit mapped printable images that are supplied to image memory 20. The bit map image is then supplied to a print mechanism and controller 22 of a print engine for printing.

A separately located Personal Computer (PC) 30 uses printer 10 either in a stand alone configuration or functioning as a print server providing printer services to other processors (not shown). PC 30 includes a microprocessor 32 connected to input/output module 34 for communicating with printer 10 over an appropriate communications link, such as a bidirectional serial or parallel port connection. PC 30 also includes an application 36 providing printable output in the form of, for example, Graphical Device Interface (GDI) commands, to driver 38. An output from driver 38 is connected through input/output module 34 to printer 10.

Printer 10 also includes an interface to a source of device drivers. According to one embodiment, input/output module 12 of printer 10 includes an interface to a local network server 40 having access to a locally stored database of most current version of device drivers required by operating system and application software routines resident on platforms served by server 40. Local network server 40 may also provide access to Internet 44 for providing remote access to manufacturer maintained device driver databases 46. In yet another configuration such as when PC 30 is not networked, printer 10 may have dedicated access to Internet 44 to obtain downloads of device drivers from remote device driver database 46.

Operationally, microprocessor 32 of PC 30 is controlled by a operating system also tasked with controlling input/output module 34 and under which application 36 and driver 38 operate. Application 36 may be, for example, a wordprocessing, graphics, spreadsheet, or any other application or utility requiring a device driver to support its operations, typically input or output. Thus, while in the example of FIG. 1, application 36 is providing output through a driver 38 for interfacing with printer 10, driver 38 might interface application software to a scanner, storage device, or other internal or external peripheral, etc. In the present example, upon producing a print file, application 36 provides the print file to driver 38 which performs the appropriate translations from, for example, GDI to PCL. The processed PCL file, including an indication of the version of the driver used to perform the translation, is supplied via input/output module 34 to input/output module 12 of printer 10.

Printer 10, upon receipt of the PCL file, identifies the version of driver 38 used to produce the file. Microprocessor 14 includes appropriate programming for parsing the stream to detect the version and then compares that with the version number of the latest printer driver stored in memory 16. If microprocessor 14 determines that the version used is the latest version of the printer driver available, then processing proceeds as normal and the PCL file is provided to formatter 18 for conversion into the appropriate bitmap or other printable format and stored in image memory 20. The output of image memory 20 is then supplied to print mechanism and controller 22 comprising a print engine for outputting the image onto paper.

If the version of driver 38 does not correspond with the latest version of printer driver stored in memory 16, microprocessor 14 suspends processing of the PDL file and sends a message to PC 30 informing the user that the version of the driver used to produce the PCL file is not the latest available and provides the user with one or more options for processing the file. These options may include (i) ignoring the message and processing the output file in the normal manner; (ii) processing the output file as generated and subsequently updating driver 38 to the latest version of the printer driver; (iii) terminating output processing, loading and installing the latest version of printer driver 16 from printer 10 to driver 38 of PC 30, and reinitiating output of a new GDI file from application 36 using the now updated driver 38 with normal processing following; and (iv) "rehabilitating" the PCL file processed by the older version of the printer driver, to the extent possible, to provide required patches and/or alternative functionality implemented by the latest version of the printer driver 16. This latter option (iv) may be performed by microprocessor 14 in combination with the latest version printer driver 16 and/or additional translations for rehabilitating a previously generated PCL file to incorporate revised translations implemented by the latest version of the printer driver.

The options and messages provided to the user of PC 30 by printer 10 may include further information about (i) additional functionality provided by the latest version of the printer driver, (ii) whether the latest version of the printer driver implements any required fixes to avoid processing errors, (iii) whether the particular PCL file received by printer 10 from PC 30 would be affected by updates to the printer driver, and (iv) alternative sources of downloads for the printer driver (e.g. from a manufacturer's website) and where to obtain additional information about the printer driver.

As shown in FIG. 1, printer 10 may have local access to a database of device drivers through local network server 40 for downloading the latest version of printer driver 16. Local network server 40 may also provide Internet access 44 for downloading device drivers from a remote device driver database, e.g. a manufacturer's printer driver website. Alternatively, printer 10, particularly in a stand alone environment, may have direct access to Internet 44 or may gain access to the Internet via PC 30 (not shown). Further, while the latest version of printer driver 16 is shown stored in the memory of printer 10, this information may instead be abbreviated to include an indication of the latest version number of the printer driver and a pointer to the appropriate database 42 or 46 for obtaining a copy of that latest version.

Figure 2:
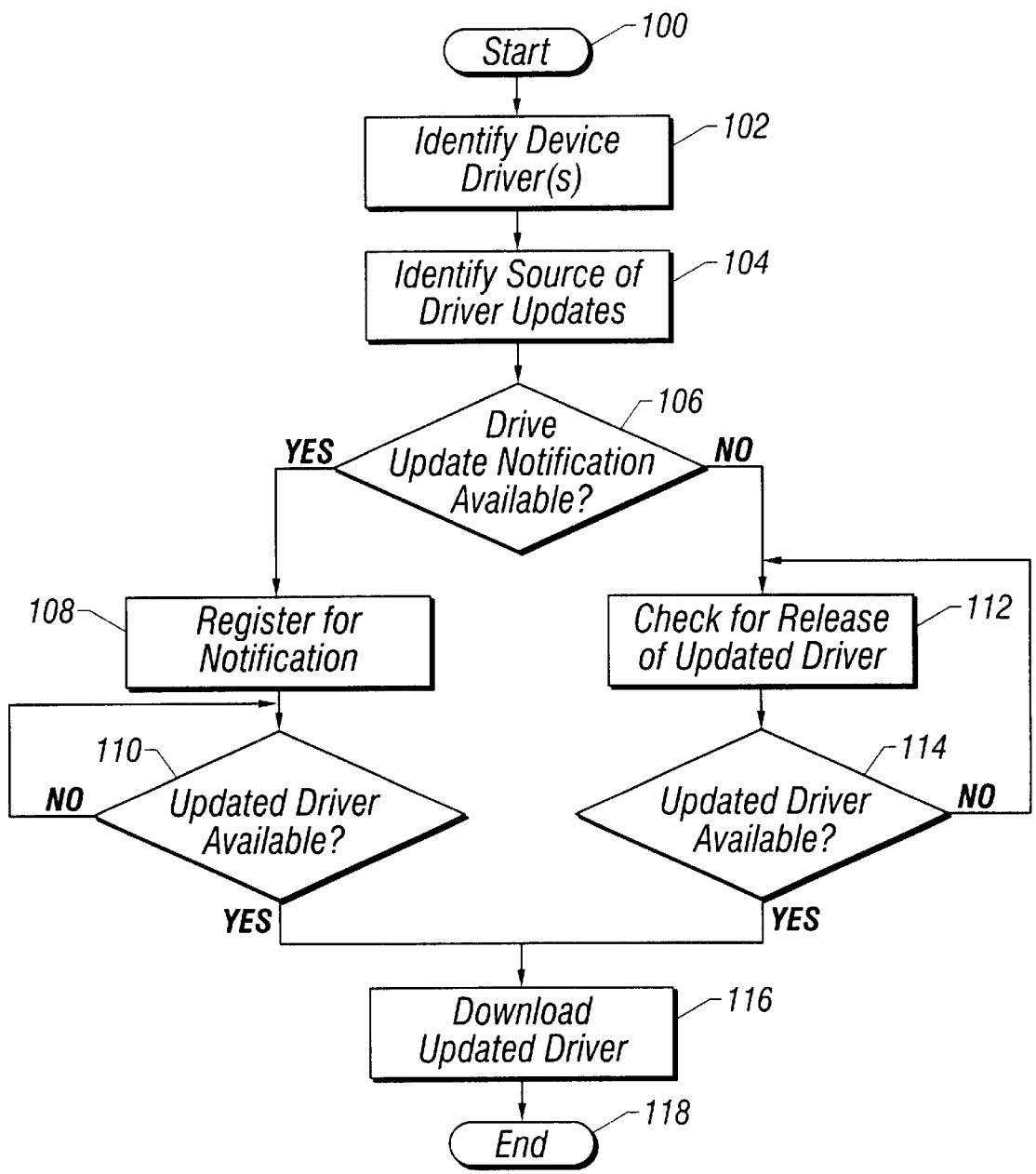
FIG. 2 is a logic flow diagram of a method according to a preferred embodiment of the invention for updating a local copy of a device driver.

The process for updating the printer driver stored in or pointed to by printer 10 is shown in FIG. 2 of the drawings. Referring to the FIGURE, subsequent to start 100, device drivers supported by the target device and used by applications known to that device are identified at step 102. In the current example, printer 10 (the target device) maintains a list of printer drivers used by the various applications and/or operating systems installed on and/or registered to PC 30 so that the appropriate printer drivers can be downloaded into memory or a source of download identified. Thus, at step 104, sources for the driver updates are identified, for example, by using the manufacturer's printer driver website preprogrammed into printer 10, or by using a local or web resident printer driver search engine. At step 106, a determination is made as to whether the manufacturer or other entity providing printer drivers has an update notification facility for automatically notifying registered users of their devices of the availability of a new version of the corresponding drivers. If, and to the extent, the manufacturer provides driver update notifications, the device, in this case, printer 10, registers for the notification step at 108. Upon receiving notification that an updated driver is available at decision 110, processing continues at step 116 to download the updated driver into memory, the process terminating at 118.

If, or to the extent, that a driver update notification facility is not available or is not selected, processing continues at step 112 to check for release of an updated driver. This may include accessing the appropriate manufacturer's website or searching the Internet for appropriate driver information. Upon identifying an updated driver at decision 114, the processing continues at 116 to obtain and store a copy of the driver in the target device, e.g. printer 10.

Figure 3:
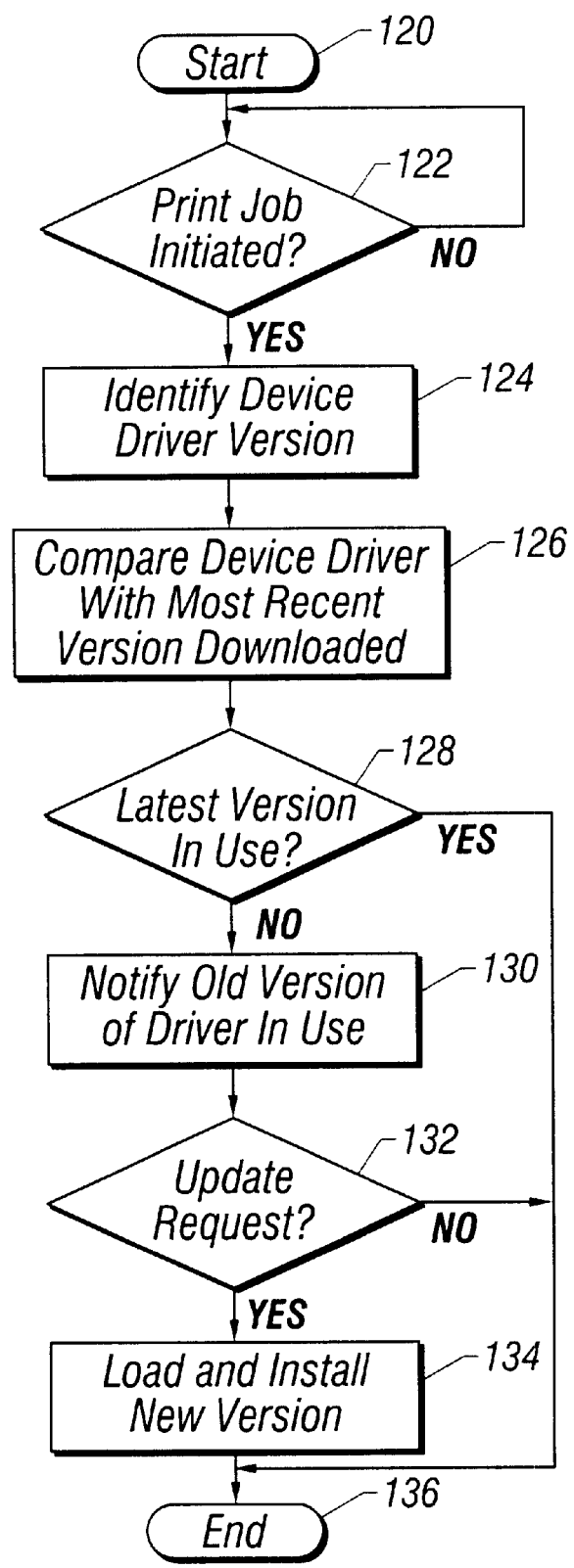
FIG. 3 is a logic flow diagram of a method according to a preferred embodiment of the invention for detecting a version of a device driver being used and providing for the updating of the device driver.

One alternative for detecting use of an older version of a driver and providing for downloading of a locally stored copy of a newer version of the driver is represented by the flow diagram shown in FIG. 3. After starting the process at 120, the processing awaits initialization of a print job that will be or has already been translated by a device driver. The version of the device driver is identified as step 124 and, at step 126 is compared with the most recent version downloaded into local memory. Alternatively, step 126 may perform the comparison with versions known to be available, but not yet downloaded into local memory. At decision 128, continuation that the latest version of the driver is in use results in processing terminating at step 136. Alternatively, if the version in use is not the latest, notification of the user of this fact is provided at step 130 and the user is requested to indicate an appropriate action. As previously described, the notification may be given prior to processing of the current print job so that the user may elect to terminate processing and download the newest version of the driver. Alternatively, if known updates incorporated into the latest version of the device driver would not affect processing of the current print job initiated, then an appropriate message may be generated so that the user may elect to continue processing and download and install the updated device driver subsequently. Thus, if the user elects to update the device driver, this function is performed and the driver installed at step 134. Alternatively, if the user elects not to update the driver, processing terminates, again at step 136 without downloading and installation of the revised device driver.

Although the present invention has been described in terms of a printer driver and other forms of drivers associated with output from an application to a peripheral output module, the invention is equally applicable to other drivers including for example, those for scanners and disk drives. The invention is further applicable to other routines and agents embodied in software, firmware and/or hardware, i.e. resident on a first device for interfacing a second device wherein the second device includes processing for identifying the availability of an updated version of the routine or agent and so notifies the first device. Such notification may be performed in response to an attempt by the first device to utilize an older version of the routine or agent.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A printer, comprising:

a communication interface;

memory; and a processor for processing data received via said communication interface, wherein said processor, when operating under control of instructions stored on said printer, is operable to download a driver from a remote resource via the Internet utilizing said communication interface to store said downloaded driver in said memory, wherein said driver defines instructions for generating print messages for said printer and is associated with a first version identifier, said processor being further operable to parse a second version identifier from a print message when a client system communicates data to said printer via said communication interface, wherein said processor communicates said downloaded driver to said client system when said processor determines said second version identifier does not match said first version identifier.

2. The printer of claim 1 wherein said print message is a page description language (PDL) message.

3. The printer of claim 1 wherein said print message is received when said client system communicates data to print a document.

4. The printer of claim 3 wherein said processor ceases generation of a bitmap image from data communicated by said client system for said document to be printed, when said processor communicates said downloaded driver to said client system.

5. The printer of claim 1 wherein said processor communicates a message to said client system to indicate that said downloaded driver is available, before said processor communicates said downloaded driver.

6. The printer of claim 1 wherein said remote resource is a database.

7. The printer of claim 6 wherein said database is accessible by said processor through a web site.

8. A method of operating a printer, comprising:

downloading a driver from a remote resource by said printer, wherein said driver defines instructions for generating print messages for said printer and is associated with a first version identifier;

storing said driver in memory of said printer;

receiving, by said printer, a print message from a client system;

parsing a second version identifier from said print message; and communicating said downloaded driver to said client system when said second version identifier does not match said first version identifier.

9. The method of claim 8 wherein said print message is a page description language (PDL) message.

10. The method of claim 8 wherein said print message is received when said client system communicates data to print a document.

11. The method of claim 8 further comprising:

ceasing generation of a bitmap image from data communicated by said client system for said document to be printed, when communicating said downloaded driver to said client system.

12. The method of claim 8 further comprising;

communicating a message to said client system to indicate that said downloaded driver is available, before communicating said downloaded driver.

13. The method of claim 8 wherein said remote resource is a database.

14. The method of claim 13 wherein said database is accessible through a web site.

15. A printer, comprising:

network interface means for communicating data in a network;

memory means for storing data;

means for downloading a driver from a remote resource via said network interface means, wherein said driver defines instructions for generating print messages for said printer and is associated with a first version identifier;

means for storing said driver in said memory means;

means for processing a print message from a client system;

means for parsing a second version identifier from said print message; and means for communicating said downloaded driver to said client system when said second version identifier does not match said first version identifier.

16. The printer of claim 15 wherein said print message is a page description language (PDL) message.

17. The printer of claim 15 wherein said print message is received when said client system communicates data to print a document.

18. The printer of claim 15 further comprising:

means for generating a bitmap image from data communicated by said client system for said document to be printed, wherein said means for generating ceases operations when said means for communicating said downloaded driver to said client system is operable.

19. The printer of claim 15 further comprising;

means for communicating a message to said client system to indicate that said downloaded driver is available, before said means for communicating said downloaded driver is operable.

20. The printer of claim 19 wherein said remote resource is a database that is accessible through a web site.

* * * * *